(No Model.)

G. W. PATTERSON.
HUB ATTACHING DEVICE.

No. 277,425. Patented May 8, 1883.

WITNESSES:
A. P. Grant
W. F. Kircher

INVENTOR:
George W. Patterson,
BY John A. Wiedersheim
ATTORNEY.

N. PETERS, Photo-Lithographer, Washington, D. C.

United States Patent Office.

GEORGE W. PATTERSON, OF PHILADELPHIA, ASSIGNOR OF ONE-HALF TO AZARIAH CARSON, OF COATESVILLE, PENNSYLVANIA.

HUB-ATTACHING DEVICE.

SPECIFICATION forming part of Letters Patent No. 277,425, dated May 8, 1883.

Application filed January 17, 1883. (No model.)

*To all whom it may concern:*

Be it known that I, GEORGE W. PATTERSON, a citizen of the United States, residing in the city and county of Philadelphia, State of Pennsylvania, have invented a new and useful Improvement in Attaching Wheels to Axles, which improvement is fully set forth in the following specification and accompanying drawings, in which—

Figure 1:
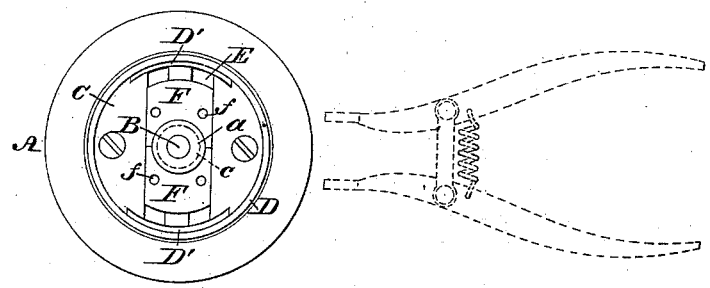
Figure 2:
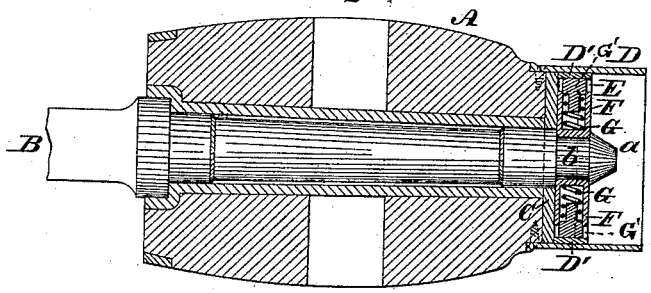
Figure 3:
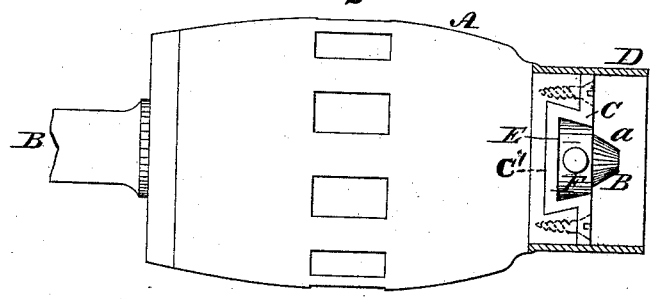
Figure 4:
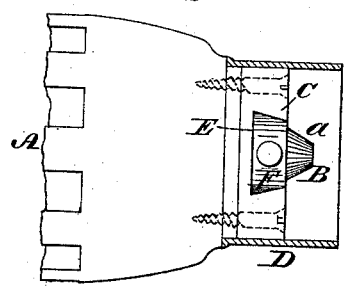

Figure 1 is an end view of a wheel hub and axle attached according to my invention. Fig. 2 is a longitudinal section thereof. Fig. 3 is a side elevation thereof, partly sectional. Fig. 4 is a side elevation, partly sectional, of a modification.

Similar letters of reference indicate corresponding parts in the several figures.

My invention consists of an improved method of attaching a wheel to its axle, whereby it can be readily applied to and removed therefrom. For this purpose I secure to the end of the hub of the wheel a casting or stock, which has on its outer face a groove or way, within which are fitted two bolts, which are adapted to engage at opposite places with the axle, so that the wheel and axle are securely connected, and the bolts may be readily separated, to permit the disengagement of the wheel and axle by a tool or implement applied through the band of the wheel, all as will be hereinafter fully set forth.

Referring to the drawings, A represents the hub of a vehicle-wheel, and B the axle thereof, which latter has a conical or pointed head, *a*, and adjacent thereto a neck, *b*.

C represents a cylindrical casting or stock, which is screwed or otherwise secured to the outer end of the hub, according with said end and circumscribed by the band D of the hub. In the outer face of said stock C is a groove or way, E, which extends at a right angle to the axle, and contains two sliding bolts, F, arranged end to end, the inner end of each having at its center a semi-cylindrical recess, *c*, to receive the neck *b* of the axle B, the sides of the way and bolts being of dovetailed form. The bolts are hollow in the direction of their length, and within the hollow or opening of each bolt is a spring, G, which also rests against the band D, or a band, D', which is fitted partially or entirely around the stock C, so as to form an abutment or bearing for the spring, the two springs serving to force the bolts F toward each other and the axle. The band D' is shown in Figs. 1 and 2 and removed in Figs. 3 and 4, being secured to the stock C, and preventing displacement of the springs when the band D is removed.

It will be seen that when the axle is within the hub and one moved toward the other the conical head *a*, coming in contact with the walls of the recesses *c* at the rear thereof, separates the bolts until the latter clear said head *a*, the bolts then springing into the neck *b*, and serving to connect the wheel and axle in a convenient, secure, and reliable manner without the employment of a linchpin, nut, or similar loose piece.

In order to disconnect the wheel from the axle, the bolts F require to be operated in opposite direction, thus separating them and moving them from the neck of the axle, whereby the wheel may be readily withdrawn from the axle, or vice versa, the head of the axle readily passing through the space created between the inner ends of the bolts by the separation thereof.

In order to operate both bolts simultaneously, I form on the outer face of each bolt one or more lugs or openings, *f*, and employ a pair of tongs, the jaws or ends of which may be fitted to said lugs or openings, so that by closing the handles of the tongs the jaws separate and move the bolts in opposite directions.

It will also be seen that, as the stock is firmly secured to the hub, the tool or implement to open or separate the bolts may be inserted through the end of the band, and that said band is similar to the band usually attached to a hub. Furthermore, while the stock and bolts are dovetailed or tongued and grooved, said bolts retain their places in the groove or way E, and are prevented from outward displacement. The two bolts, being placed end to end and having coincident recesses, close fully around the axle back of the head *a*, and prevent dirt, &c., entering between the hub and axle, the two bolts, moreover, by means of the two recesses, forming a cylindrical opening, and having their outer faces bear equally around the back of the head of the axle, thus assisting to cause the wheel to run true on the axle. The back of the stock is formed with a tongue, C', which enters a mortise in the end of the hub, as in Fig. 3, thus interlocking the stock and hub, said tongue and mortise being, however, dispensable, as in Fig. 4. The springs G enter the openings in the bolts, as has been stated, and against the springs on their outer ends bear plugs G', which also bear against the band, so that the outer ends of the openings are closed by said plugs against the entrance of frost, rain, dirt, &c., and the springs are accordingly guarded.

I am aware that it is not new to connect with a band a bearing-plate to which is fitted a bolt of annular form, which is adapted to engage with the neck of a wheel-axle, said bolt, however, having but a small portion of its periphery bearing against the axle, and thus not bearing uniformly all around the axle. The annular bolt is, moreover, not accessible from the outer end of the band, and when the band is removed said bolt and its spring lose their hold. Such construction also requires the employment of a screw passed through the band to disconnect the bolt from the axle, and the bolt in its movement rubs against the end of the hub, all of which features are avoided by my construction. The stock is a fixture of the hub, the bolts are reached from the end of the band, an ordinary band is employed, the removal of the band does not disturb the stock and bolts, and the bolts are in contact on their sides and back with the metal of the stock, and do not touch the wood of the hub. Again, as my bolts are arranged end to end, they come in contact, whereby the neck of the axle is relieved of friction of the bolts.

I am also aware that it is not new to employ two bolts as fastening devices for wheels and axles; but the same is so constructed in one case as to be opened by a scroll device at the front of the hub, and in other case to be held closed by a spring-key, which is connected with the bolts and opened by a button, the lever of which is at the front of the hub, such device and lever being dispensed with by my construction.

Having thus fully described the construction, operation, and advantages of my invention, what I claim as new, and desire to secure by Letters Patent, is—

1. In a wheel and axle attachment, a stock secured to the wheel and formed with a groove or way, in combination with two bolts fitted in said groove end to end, and having openings $f$ on their outer faces for the reception of the jaws of a pair of tongs, substantially as and for the purpose set forth.

2. A wheel and axle attachment, consisting of a grooved stock, springs, and two hollow bolts, the latter containing within them said springs, substantially as and for the purpose set forth.

3. A wheel and axle attachment consisting of a grooved stock, two bolts, springs fitted in openings in said bolts, and plugs, which latter bear against the springs in the openings in the bolts and close the outer ends of said openings, substantially as and for the purpose set forth.

4. In a wheel and axle attachment, a grooved stock, bolts, and springs, in combination with an inner band, D', which is secured to said stock and inclosed by the band D of the wheel, substantially as and for the purpose set forth.

GEO. W. PATTERSON.

Witnesses:
JOHN A. WIEDERSHEIM,
A. P. GRANT.